(12) United States Patent
Perrine et al.

(10) Patent No.: US 6,942,193 B2
(45) Date of Patent: Sep. 13, 2005

(54) SELF-SEALING END FITTING (75) Inventors: Neill D. Perrine, Jackson, MI (US);
Russell L. Rogers, Munith, MI (US);
Alexander P. Webster, Concord, MI (US)

(73) Assignee: Eaton Corporation, Cleveland, OH (US)

( * ) Notice: Subject to any disclaimer, the term of this patent is extended or adjusted under 35 U.S.C. 154(b) by 151 days.

(21) Appl. No.: 10/222,374

(22) Filed: Aug. 16, 2002

(65) Prior Publication Data
US 2004/0031942 A1 Feb. 19, 2004

(51) Int. Cl.⁷ .............................................. F16L 29/00
(52) U.S. Cl. .................................. 251/149.6; 251/149.1
(58) Field of Search ........................ 251/149.6, 149.8, 251/149.1

(56) References Cited

U.S. PATENT DOCUMENTS

| | | | | |
|---|---|---|---|---|
| 4,023,584 A | * | 5/1977 | Rogers et al. | 137/68.14 |
| 4,260,184 A | * | 4/1981 | Greenawalt et al. | 285/305 |
| 4,287,914 A | * | 9/1981 | Buseth et al. | 251/149.8 |
| 5,423,515 A | * | 6/1995 | Ozaki | 251/149.6 |
| 5,555,908 A | * | 9/1996 | Edwards et al. | 251/149.6 |
| 5,624,073 A | * | 4/1997 | Mueller et al. | 251/149.6 |
| 5,901,761 A | * | 5/1999 | Rutter et al. | 251/149.6 |
| 5,967,491 A | * | 10/1999 | Magnuson et al. | 251/149.6 |
| 6,108,895 A | * | 8/2000 | Helsley, Jr. | 29/516 |
| 6,158,717 A | * | 12/2000 | Van Scyoc et al. | 251/149.6 |

FOREIGN PATENT DOCUMENTS

DE  3300328 A1 * 7/1984 ........... F16L/29/00

OTHER PUBLICATIONS

Aerospace Industries Association, National Aerospace Standard, NAS1760 (3 pages).
Aeroquip Aerospace Engineering Bulletin, AA86 (2 pages).

* cited by examiner

*Primary Examiner*—J. Casimer Jacyna
(74) *Attorney, Agent, or Firm*—Honigman Miller Schwartz and Cohn LLP (57) ABSTRACT

A self-sealing end fitting including an adapter receptive of an NAS specified fitting and a valve biased to a closed position, where the valve opens when mated to the NAS specified fitting.

24 Claims, 4 Drawing Sheets

| TUBE SIZE DASH NO | TUBE OD REF | (A) | B GAGE (1) | C ±.002 | D +.000 -.005 | E +.000 -.005 (2) | ③ F +.007 -.006 | G RAD ±.005 | H +.005 -.000 |
|---|---|---|---|---|---|---|---|---|---|
| 02 | .125 | .1627 | .1730 | .178 | .132 | .063 | .134 | .160 | .196 |
| 03 | .187 | .1887 | .2340 | .243 | .193 | .117 | .140 | .260 | .242 |
| 04 | .250 | .2037 | .2930 | .302 | .258 | .179 | .155 | .260 | .242 |
| 05 | .312 | .2057 | .3500 | .359 | .321 | .234 | .157 | .260 | .258 |
| 06 | .375 | .2127 | .4120 | .421 | .383 | .296 | .164 | .260 | .313 |
| 08 | .500 | .2666 | .5600 | .575 | .511 | .414 | .189 | .400 | .313 |
| 10 | .625 | .2786 | .6730 | .688 | .638 | .500 | .201 | .400 | .358 |
| 12 | .750 | .3056 | .8100 | .825 | .763 | .651 | .228 | .400 | .358 |
| 14 | .875 | .3111 | .9350 | .950 | .888 | .775 | .234 | .400 | .373 |
| 16 | 1.000 | .3746 | 1.0620 | 1.077 | 1.013 | .903 | .297 | .400 | .423 |
| 20 | 1.250 | .3776 | 1.3160 | 1.331 | 1.267 | 1.093 | .300 | .400 | .423 |
| 24 | 1.500 | .4426 | 1.5650 | 1.580 | 1.517 | 1.336 | .365 | .400 | .493 |
| 32 | 2.000 | .4476 | 2.0680 | 2.083 | 2.019 | 1.813 | .370 | .400 | .493 |

SELF-SEALING END FITTING

FIELD OF THE INVENTION

The present invention related to fluid distribution systems. More particularly, the present invention is directed to a self-sealing end fitting of a fluid distribution system.

BACKGROUND OF THE INVENTION

It is common in many industries to find fluid couplings for connecting two sections or hoses together. Coupling devices usually include a male end and a female end that mate together in a sealed arrangement to allow fluid to pass freely from one section to the other. Often fluid coupling devices include a quick-disconnect mechanism to facilitate engagement and separation of the male section and the female section without the aid of any tools.

In many fluid distribution systems, however, the fluids being distributed are dirty, flammable, hazardous, or otherwise unsuitable for general release to the atmosphere. For such fluids, it therefore becomes desirable to connect and disconnect the two sections with little or no spilling.

In order to prevent spilling, it is common to provide coupling devices with at least one ball valve element that rotates angularly from a flow-preventing position to a flow-permitting position upon axial insertion of one coupling section into the other, and vice versa. This type of coupling device is sometimes called "self-sealing" because such valve elements automatically block the flow passage when the coupling ends are separated from one another. However, the rotating ball valves are sometimes difficult to maintain such that they easily rotate open and closed with engagement and disengagement of the two sections.

In addition, many industries, including the aerospace, automotive, and oilfield industries, have adopted standards for fittings, couplings, flanges, and other like components. The standards allow industry members to design and use components parts that can be easily replaced and are known to meet certain specifications. While the standards facilitate ease of replacement by promoting interchangeable parts, in many instances the standard designs do not accommodate specialized couplings and fittings that may be necessary for particular applications. For example, while there are several self-sealing couplings available for particular old designs, there may not be any compatible with NAS (National Aerospace Standards) fittings.

The present invention is directed to eliminating, or at least reducing the effects of, one or more of the problems described above.

SUMMARY OF THE INVENTION

The present invention meets the above-described needs and others. Specifically, the present invention provides a self-sealing end fitting including an adapter receptive of an NAS specified fitting and a valve biased to a closed position, where the valve opens when mated to the NAS specified fitting.

The present invention also provides an end fitting including a valve and an adapter configured to mate with a modified NAS 1760 fitting, wherein the valve automatically opens upon insertion of the modified NAS 1760 fitting, and automatically closes upon withdrawal of the modified NAS 1760 fitting.

The present invention also provides a method of connecting hoses including inserting a modified NAS specified fitting partially into an end fitting, creating a seal between the modified NAS specified fitting and an adapter of the end fitting, and opening a valve of the end fitting by inserting the modified NAS specified fitting fully into the end fitting.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

In the drawings, identical reference numbers indicate similar, but not necessarily identical, elements. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF A PREFERRED EMBODIMENT

Illustrative embodiments of the invention are described below. As will be appreciated by those skilled in the art, the present invention can be implemented in a wide variety of applications. The applications include, but are not limited to, industrial, aerospace, automotive, and chemical.

Figure 1:
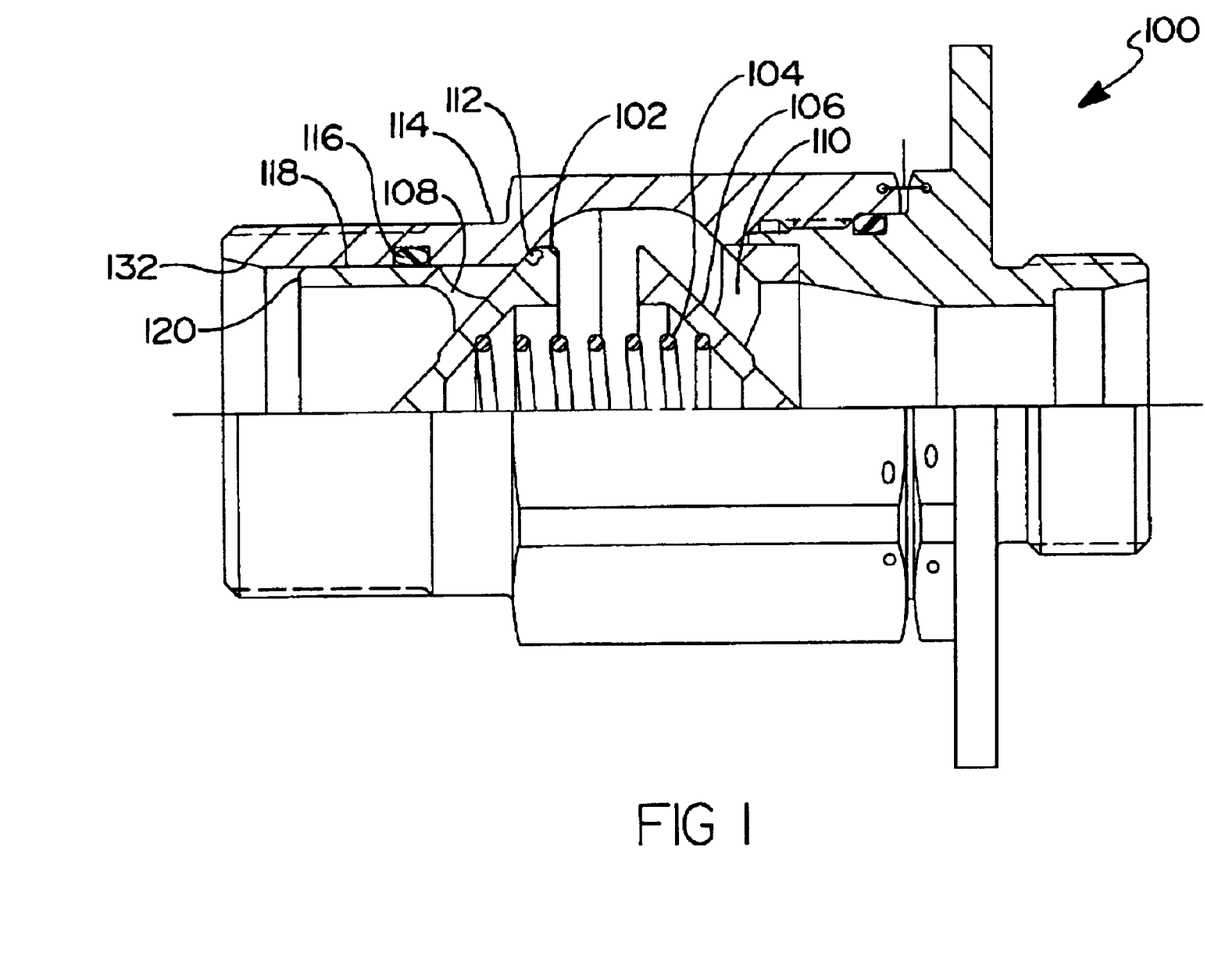
FIG. 1 is a cross-sectional view of a self-sealing end fitting according to one embodiment of the present invention.

Turing now to the figures, and in particular to FIG. 1, a self-sealing end fitting (100) according to one embodiment of the present invention is shown. As discussed above, there are many applications in the aerospace, chemical, industrial, and other industries that often connect and disconnect supply hoses for fluid distribution. Because in most cases it is desirable to limit or eliminate spills from supply hoses as they are connected and disconnected to one another or other components, the self-sealing fitting (100) of the present embodiment includes a valve (102) for isolating a fluid stream in a closed position and allowing fluid flow in an open position. According to the embodiment shown in FIG. 1, the valve (102) is biased to the closed position shown. The valve (102) is a moveable component that is biased to the closed position by a biasing member, for example a spring (104). The spring (104) is compressed between the valve (102) and a guide (106). The valve (102) and guide (106) may be made of, for example, 2024 aluminum or other structural materials including, but not limited to: stainless steel and tool steel.

In the absence of an opposing force on the movable valve (102) sufficient to overcome the force applied to the valve (102) by the spring (104), the valve (102) is closed and prevents fluid passage and/or leakage. Therefore, the valve (102) will generally be closed when the end fitting (100) is detached from other fittings.

Figure 2:
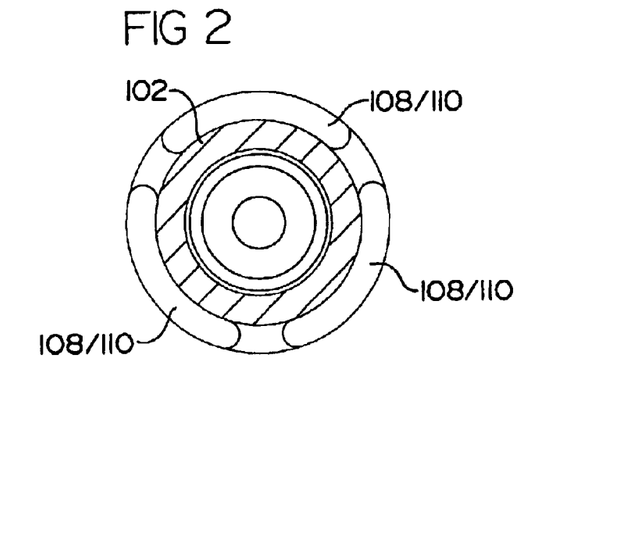
FIG. 2 is a front cross-sectional view of a valve of the self-sealing end fitting of FIG. 1 according to one embodiment of the present invention.

Although the valve (102) is biased to a closed position, the valve (102) and the guide (106) may include flutes (108 and 110, respectively) facilitating the passage of fluid thereby when the valve (102) is in an open position. The valve (102) and the flutes (108) may be seen more clearly in FIG. 2. According to the embodiment of FIG. 2, the flutes (108) are milled at three spaced intervals around the circumference of the valve (102). A similar milling arrangement is located about the guide (106, FIG. 1). The milled flutes (108) may, for example, be arranged equidistant from one another and span an arc of approximately 60 to 85 degrees. In the preferred embodiment shown, each of the milled flutes (108) span approximately 78 degrees each. However, other arrangements and arc lengths may also be used.

Returning to FIG. 1, the valve (102) includes a sealing member (112) integrated therein. The sealing member (112) may be an elastomeric element and may be bonded, molded, or otherwise attached to the valve (102). The sealing member (112) of the present embodiment is shown in the closed position abutting an adapter (114). The adapter (114) is receptive of mating fittings and may be made of, for example, 15-5 stainless steel. Other structural materials including, but not limited to, tool steel and aluminum, may also be used. A packing, for example an elastomeric O-ring (116), seals an annulus (118) between the valve (102) and the adapter (114). While the valve (102) is biased to the closed position shown, it may be opened by the application of a force that is sufficient to overcome the compression force supplied by the spring (104). As discussed in more detail below, in some embodiments, a force is applied to the valve (102) at a surface (120) thereof to open the valve (102).

Figure 3:
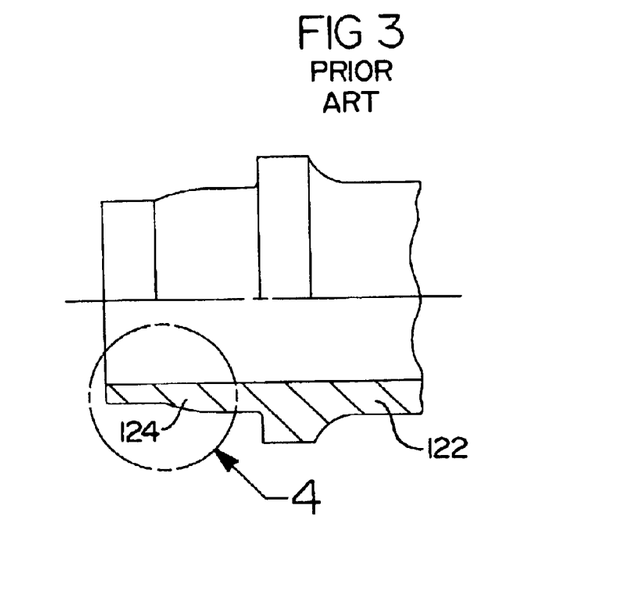
FIG. 3 is a cross-sectional view of an NAS 1760 specification fitting.

The adapter (114) includes a tapered end portion (132) and is receptive of a mating fitting, for example an NAS specified fitting. As discussed above, the promulgation of standards such as the NAS 1760 for aerospace fittings may be useful for component manufacturers and users. Referring to FIG. 3, a representation of the NAS 1760 specification is shown that may be compatible with the adapter (114) according to the present invention. The National Aerospace Standards Committee promulgates the standard NAS 1760 specification fitting of FIG. 3 and the illustration shown represents the most recent revision of Aug. 29, 1997. The NAS 1760 specification shows a tubular fitting nose portion (124) and identifies standard dimensions based on various tube sizes that the fitting (122) may be use for. The nose portion (124) of the NAS specification fitting (122) is tapered for insertion into a mating fitting such as the adapter (114). The nose portion (124), which includes a curve or tapered section (125), is shown in detail in FIG. 4. A length (126) of the nose portion (124) is defined by the NAS 1760 specification between 0.134 and 0.370 inches for tube size dash nos. 02–32. Table 1 of FIG. 5 identifies the specific length (126) of the nose portion (124) according to tube size used in column "F."

Figure 4:
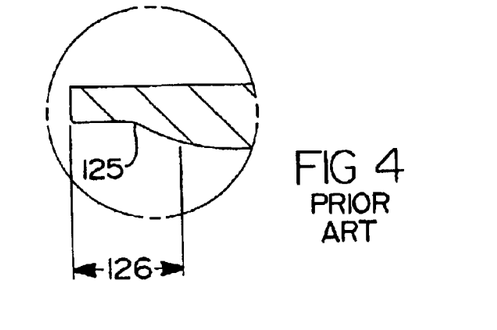
FIG. 4 is a cross-sectional detail view of the NAS 1760 specification fitting of FIG. 3.
Figure 5:
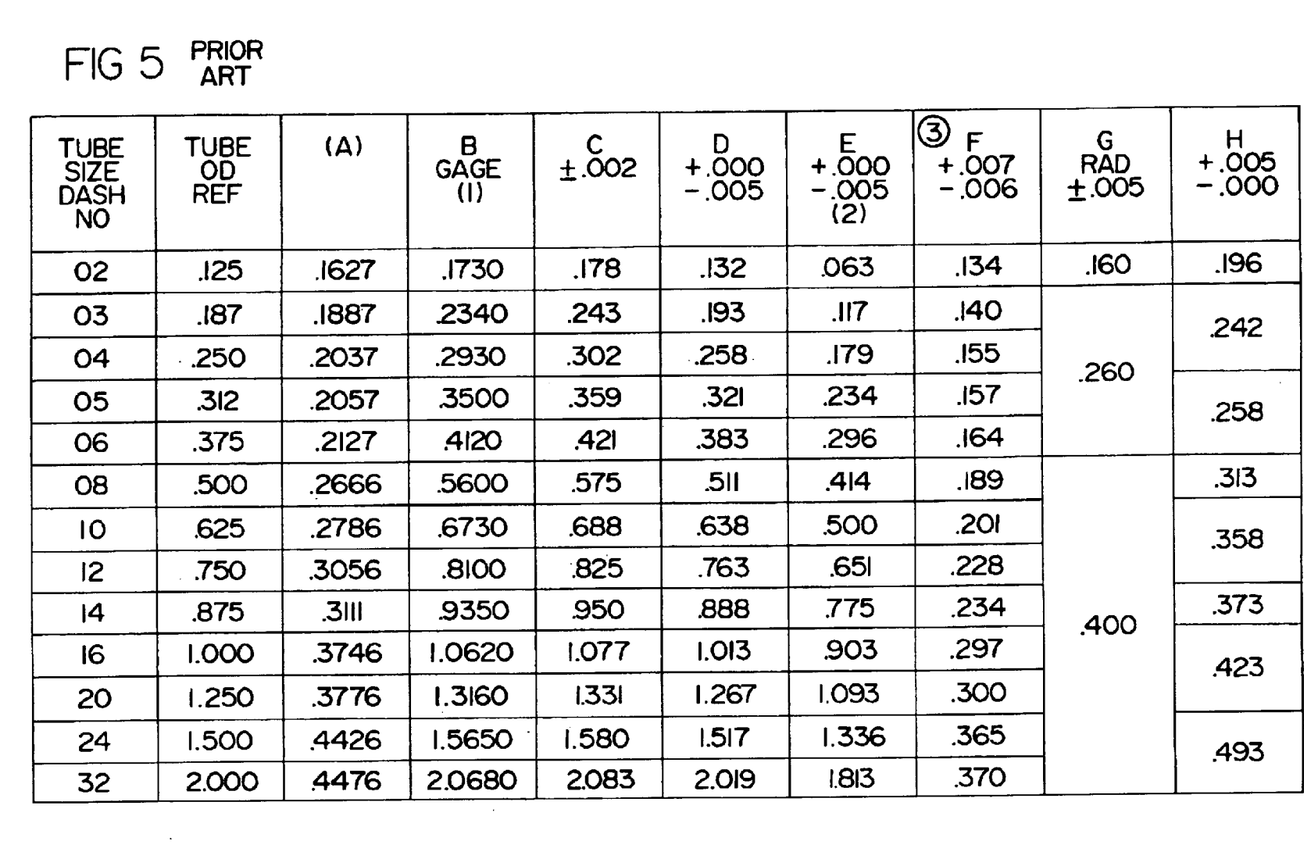
FIG. 5 is a table of the NAS 1760 specification.
Figure 6:
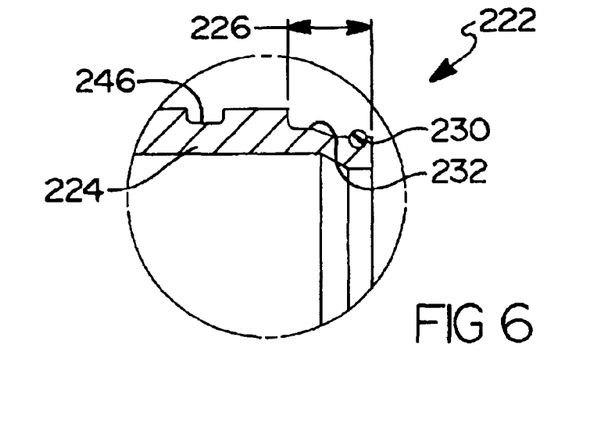
FIG. 6 is a cross-sectional detail view of a modified NAS 1760 specification fitting according to one embodiment of the present invention.

According to the standard NAS 1760 specification shown in FIGS. 3–5, the nose portion (124) does not include any elastomeric seals to prevent leakage during connection between the nose portion (124) and a mating fitting (such as adapter (114) shown in FIG. 1). Therefore, the NAS 1760 specifications may be modified according to one embodiment of the present invention. Referring to FIG. 6, an NAS 1760 specification fitting (222) has been modified from the normal standard to include a packing element. According to the embodiment of FIG. 6, the packing element is an elastomeric O-ring (230) that provides an interim seal as the modified NAS 1760 fitting (222) is inserted into the self-sealing end fitting (100, FIG. 1).

The nose portion (224) of the modified NAS specified fitting (222) may also be tailored with an increase in length (226) over the standard NAS 1760 specification. In some embodiments, the length (226) of the NAS specified fitting (222) is modified to measure about 0.6 to 1.0 inches. In one preferred embodiment, the length (226) is about 0.706 inches. However, it will be understood by those of skill in the art having the benefit of this disclosure that the length (226) may be otherwise modified—or unchanged—according to the specific application. Further, the modified NAS specified fitting (222) may include a first recess (246) cut or milled into the outer circumference of the fitting (222). The recess (246) is receptive of a drive wire (144) which is discussed in more detail below (with reference to FIG. 7). The curve or tapered portion (232) of the modified NAS specified fitting (222) is not modified according to the present embodiment of FIG. 6., but it may be changed in other embodiments.

Figure 7:
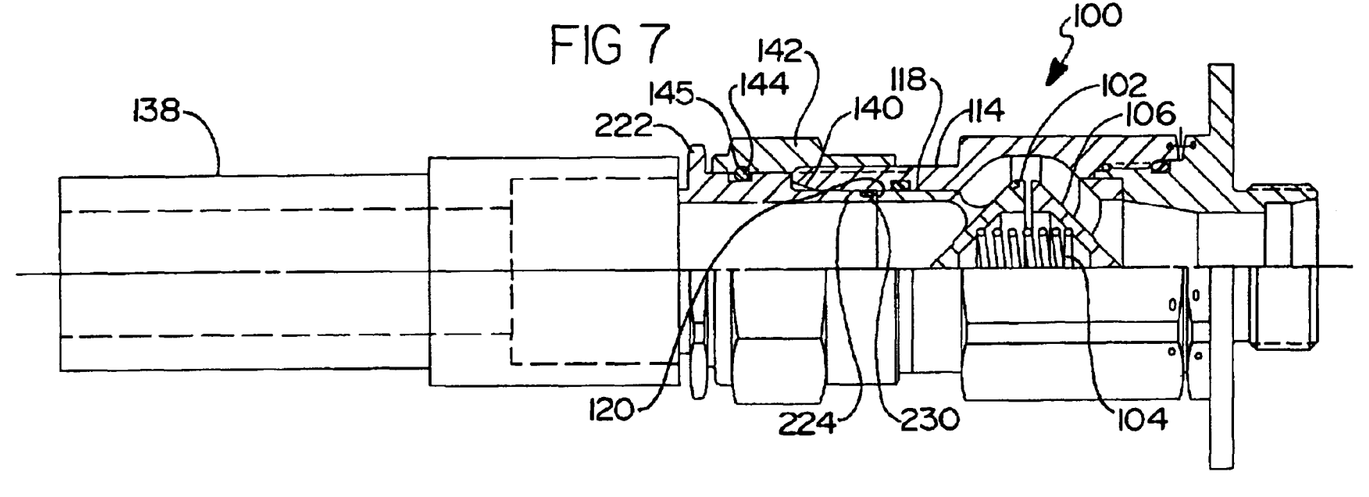
FIG. 7 is a cross-sectional view of a modified NAS 1760 specification fitting engaged with a self-sealing end fitting according to one embodiment of the present invention.

Turning next to FIG. 7, a mated assembly between the seal sealing end fitting (100) and the modified NAS specified fitting (222) is shown. Because the valve (102) is biased to the closed position a force must be applied to the surface (120) of the valve (102) to distribute fluid through the valve (102). According to the embodiment of FIG. 7, a valve opening force may be provided by the modified NAS fitting (222). The nose portion (224) of the modified NAS fitting (222) is shown abutted against the surface (120) of the valve (102) and holding the valve (102) open. The increase in length (226, FIG. 6) of the modified NAS fitting (222) ensures that the valve (102) is fully opened upon insertion of the modified NAS fitting (222) into the self-sealing end fitting (100). Therefore, the valve (102) is shown in the full open position with a hose (138) connected to the modified NAS specified fitting (222). A metal-to-metal seal (140) is established between the NAS specified fitting (222) and the adapter (114). The metal-to-metal seal (140) is created between the tapered end portion (132, FIG. 1) of the adapter (114) and the tapered portion (232, FIG. 6) of the modified NAS specified fitting (222).

The connection of the NAS specified fitting (222) with the adapter (114) is facilitated by a threaded connector (142) about the adapter (114) and (once inserted into the adapter (114)) the modified NAS specified fitting (222). The threaded connector (142) of the present embodiment is a hexagonal nut with a second recess (145) disposed therein. The second recess (145) is arranged so as to be adjacent with the first recess (246, FIG. 6) of the modified NAS specified fitting (222), such that the drive wire (144) is contained between the first and second recesses (145 and 246) when the NAS specified fitting (222) is initially inserted into the adapter (114). The drive wire (144) drives the NAS specified fitting (222) toward the valve (102) as the threaded connector (142) is rotated in a first direction (usually clockwise), and drives the NAS specified fitting (222) into the valve (102) as the threaded connector (142) is rotated in a second direction (usually counter-clockwise) to move away from the valve.

In addition, to prevent leaking when the modified NAS 1760 fitting (222) is attached to and/or detached from the self-sealing end fitting (100), the O-ring (230) of the modified NAS 1760 fitting (222) engages the adapter (114, FIG. 4) as it is inserted into the self-sealing end fitting (100). The O-ring (230) picks up a seal between the adapter (114) and the modified NAS 1760 fitting (222) as the modified NAS 1760 fitting (222) is inserted. The taper portion (132, FIG. 1) of the adapter facilitates the engagement of the O-ring (230) with the adapter (114). It will be understood that the O-ring (230) is arranged about the modified NAS 1760 fitting (222) such that it engages with the adapter (114) prior to the nose portion (224) reaching and moving the surface (120) of the valve (102) to open the valve (102). Similarly, when the modified NAS 1760 fitting (222) is removed from the self-sealing end fitting (100), the valve (102) is fully closed before the O-ring (230) disengages the adapter (114).

Operation of the self-sealing end fitting (100) is described below with reference to FIG. 7. A fluid distribution system may be in use as shown with the self-sealing end fitting (100) engaged with the modified NAS fitting (222) of the hose (138). Fluid is free to flow to or from the hose (138) and through the fittings (100 and 222) as the valve (102) of the seal-sealing end fitting (100) is fully open. When it becomes necessary to disconnect the hose (138) (for example when a user wants to provide fluid contained upstream of the valve (102) to another hose), the threaded connector (142) may be rotated counter-clockwise. As the threaded connector (142) is rotated counter-clockwise, the drive wire (144) moves the modified NAS fitting (222) away from the valve (102) and the valve moves closed. At the same time, the metal-to-metal seal (140) disengages. The spring (104) urges the valve (102) closed as the modified NAS fitting (222) is withdrawn from the adapter (114). The O-ring (230), however, continues to seal the annulus (118) between the modified NAS fitting (222) and the retainer (114) as the modified NAS fitting (222) is removed. The valve seal (112) of the valve (102) reaches a fully closed position (see FIG. 1) before the O-ring (230) disengages the adapter (114). The threaded connector (142) may continue to be rotated until the O-ring (230) finally disengages the adapter (114), and thereafter the modified NAS fitting (222) can be removed from the self-sealing end fitting (100). The self-sealing end fitting (222) seals off, preventing some fluid loss, however, the hose assembly may still contain fluid and need to be collected during disengagement.

When it becomes necessary to reattach the modified NAS fitting (222) with the self-sealing end fitting (100), the modified NAS fitting (222) may be inserted into the self-sealing end fitting (100). The O-ring (230) engages the adapter (114), creates a pick up seal, and travels along the adapter (114) as the threaded connector (142) is rotated to drive the modified NAS fitting (222) further into the self-sealing end fitting (100). Eventually, the rotation of the threaded connector (142) will drive the modified NAS fitting (222) to a point where the nose (224) engages the surface (120) the valve (102). Further rotation of the threaded connector (142) causes the valve (102) to move, opening the valve (102) and allowing fluid communication through the self-sealing end fitting (100) and to the hose (138).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A self-sealing end fitting comprising:
    an adapter receptive of an NAS specified fitting modified to include a packing and including a threaded connector with an internal drive wire;
    a valve biased to a closed position;
    wherein the valve is adapted to open when mated to the NAS specified fitting and the packing is positioned to create a seal with the adapter as the modified NAS 1760 fitting is inserted into the adapter prior to opening the valve.

2. The end fitting of claim 1, wherein the packing comprises an elastomeric pick up seal.

3. The end fitting of claim 1, wherein the modified NAS 1760 fitting comprises a nose portion approximately 0.6 to 1.0 inches in length.

4. The end fitting of claim 1, wherein the modified NAS 1760 nose portion is approximately 0.7 inches in length.

5. The end fitting of claim 1, wherein the NAS specified fitting further comprises a recess in an outer surface receptive of the drive wire for facilitating the insertion of the NAS specified fitting into the adapter.

6. The end fitting of claim 1, wherein the end fitting comprises a guide and wherein a biasing member is disposld between the guide and the valve.

7. The end fitting of claim 6, wherein the biasing member comprises a compressed spring.

8. The end fitting of claim 6, the NAS specified fitting comprises a nose portion engagable with a surface of the valve to move the valve to an open position as the NAS specified fitting is inserted into the end fitting.

9. The end fitting of claim 1, wherein the end fitting and the NAS specified fitting comprise portions of a fluid hose.

10. A self-sealing end fitting comprising:
    an adapter receptive of an NAS specified fitting modified to include a packing, the adapter including a tapered portion engagable with a tapered portion of the NAS specified fitting to create a metal-to-metal seal therebetween;
    a valve biased to a closed position;
    wherein the valve is adapted to open when mated to the NAS specified fitting and the packing is positioned to create a seal with the adapter as the modified NAS 1760 fitting is inserted into the adapter prior to opening the valve.

11. A self-sealing end fitting comprising:
    an adapter receptive of an NAS specified fitting modified to include a packing;
    a valve biased to a closed position, the valve including an elastomeric element for sealing against the adapter in the closed portion; and
    wherein the valve is adapted to open when mated to the NAS specified fitting and the packing is positioned to create a seal with the adapter as the modified NAS 1760 fitting is inserted into the adapter prior to opening the valve.

12. A self-sealing end fitting comprising:
    an adapter receptive of an NAS specified fitting modified to include a packing;

a valve biased to a closed position;

a guide;

a biasing member disposed between the guide and the valve;

a plurality of fluid paths about a circumference of each of the valve and the guide; and wherein the valve is adapted to open when mated to the NAS specified fitting and the packing is positioned to create a seal with the adapter as the modified NAS 1760 fitting is inserted into the adapter prior to opening the valve.

13. A coupling comprising:

a first NAS specified fitting including a tubular nose portion having a tapered section that tapers radially inwardly and toward a distal end of the tubular nose portion, the tubular nose portion also including a packing element positioned between the tapered section and the distal end of the tubular nose portion;

a second fitting including an adapter having a valve biased to a normally closed position, the valve including at least one flute that facilitates the passage of fluid through the valve when the valve is moved to an open position;

wherein the tubular nose portion is sized to engage and move the valve toward the open position when the tubular nose portion is inserted into the adapter, and the packing element is positioned on the tubular nose portion such that, as the tubular nose portion is inserted into the adapter, the packing element sealingly engages the adapter prior to the valve being moved to the open position; and wherein the first fitting includes a threaded connector adapted to engage a threaded interface on the adapter to draw the tubular nose portion into the adapter upon rotation of the threaded connector relative to the tubular nose portion and the adapter.

14. The coupling of claim 13, wherein the packing element includes an O-ring.

15. The coupling of claim 13, wherein the second fitting further includes a guide having at least one flute that facilitates the passage of fluid through the guide.

16. A coupling comprising:

a first NAS specified fitting including a tubular nose portion having a tapered section that tapers radially inwardly and toward a distal end of the tubular nose portion, the tubular nose portion also including a packing element positioned between the tapered section and the distal end of the tubular nose portion;

a second fitting including an adapter having a valve biased to a normally closed position, the valve including at least one flute that facilitates the passage of fluid through the valve when the valve is moved to an open position;

wherein the tubular nose portion is sized to engage and move the valve toward the open position when the tubular nose portion is inserted into the adapter, and the packing element is positioned on the tubular nose portion such that, as the tubular nose portion is inserted into the adapter, the packing element sealingly engages the adapter prior to the valve being moved to the open position; and wherein the adapter includes a tapered end portion that abuts the tapered section of the tubular nose portion to create a seal.

17. A coupling comprising:

a first NAS specified fitting including a tubular nose portion having a tapered section that tapers radially inwardly and toward a distal end of the tubular nose portion, the tubular nose portion also including a packing element positioned between the tapered section and the distal end of the tubular nose portion;

a second fitting including an adapter having a valve biased to a normally closed position, the valve including at least one flute that facilitates the passage of fluid through the valve when the valve is moved to an open position and a sealing member that seals against the adapter when the valve is moved to the closed position; and wherein the tubular nose portion is sized to engage and move the valve toward the open position when the tubular nose portion is inserted into the adapter, and the packing element is positioned on the tubular nose portion such that, as the tubular nose portion is inserted into the adapter, the packing element sealingly engages the adapter prior to the valve being moved to the open position.

18. A coupling comprising:

a first NAS specified fitting including a tubular nose portion having a tapered section that tapers radially inwardly and toward a distal end of the tubular nose portion, the tubular nose portion also including a packing element positioned between the tapered section and the distal end of the tubular nose portion;

a second fitting including an adapter having a valve biased to a normally closed position, the valve including at least one flute that facilitates the passage of fluid through the valve when the valve is moved to an open position;

wherein the adapter includes an sealing member that seals an annulus between the first fitting and the adapter; and wherein the tubular nose portion is sized to engage and move the valve toward the open position when the tubular nose portion is inserted into the annulus, and the packing element is positioned on the tubular nose portion such that, as the tubular nose portion is inserted into the annulus, the packing element sealingly engages the adapter prior to the valve being moved to the open position.

19. A self-sealing end fitting adapted to be connected to an NAS 1760 specified fitting including a tubular nose portion having a tapered section that tapers radially inwardly and toward a distal end of the tubular nose portion, a packing element positioned between the tapered section and the distal end of the tubular nose portion, and a threaded connector, the self-sealing end fitting comprising:

an adapter having a threaded interface engaged by the threaded connector to draw the tubular nose portion into the adapter upon rotation of the threaded connector relative to the tubular nose portion and the adapter;

a valve biased to a normally closed position in abutment with the adapter by a resiliently compressible member, the valve including at least one flute that facilitates the passage of fluid through the valve when the valve is moved to an open position; and wherein the valve is positioned to engage the tubular nose portion of the mating fitting when the mating fitting is received in the adapted to move the valve toward the open position, and the packing element is positioned on the tubular nose portion such that, as the tubular nose portion is inserted into the adapter, the packing element sealingly engages the adapter prior to the valve being moved to the open position.

20. The self-sealing end fitting of claim 19, wherein the packing element includes an O-ring.

21. The self-sealing end fitting of claim 19, wherein the second fitting further includes a guide having at least one flute that facilitates the passage of fluid through the guide.

22. A self-sealing end fitting adapted to be connected to an NAS 1760 specified fitting including a tubular nose portion having a tapered section that tapers radially inwardly and toward a distal end of the tubular nose portion and a packing element positioned between the tapered section and the distal end of the tubular nose portion, the self-sealing end fitting comprising:

an adapter including a tapered end portion that abuts the tapered section of the tubular nose portion to create a seal;

a valve biased to a normally closed position in abutment with the adapter by a resiliently compressible member, the valve including at least one flute that facilitates the passage of fluid through the valve when the valve is moved to an open position; and wherein the valve is positioned to engage the tubular nose portion of the mating fitting when the mating fitting is received in the adapted to move the valve toward the open position and the packing element is positioned on the tubular nose portion such that, as the tubular nose portion is inserted into the adapter, the packing element sealingly engages the adapter prior to the valve being moved to the open position.

23. A self-sealing end fitting adapted to be connected to an NAS 1760 specified fitting including a tubular nose portion having a tapered section that tapers radially inwardly and toward a distal end of the tubular nose portion and a packing element positioned between the tapered section and the distal end of the tubular nose portion, the self-sealing end fitting comprising:

an adapter, a valve biased to a normally closed position in abutment with the adapter by a resiliently compressible member, the valve including at least one flute that facilitates the passage of fluid through the valve when the valve is moved to an open position and a sealing member that seals against the adapter when the valve is moved to the closed position; and wherein the valve is positioned to engage the tubular nose portion of the mating fitting when the mating fitting is received in the adapted to move the valve toward the open position, and the packing element is positioned on the tubular nose portion such that, as the tubular nose portion is inserted into the adapter, the packing element sealingly engages the adapter prior to the valve being moved to the open position.

24. A self-sealing end fitting adapted to be connected to an NAS 1760 specified fitting including a tubular nose portion having a tapered section that tapers radially inwardly and toward a distal end of the tubular nose portion and a packing element positioned between the tapered section and the distal end of the tubular nose portion, the self-sealing end fitting comprising:

an adapter including a sealing member that seals an annulus between the NAS 1760 specified fitting and the adapter;

a valve biased to a normally closed position in abutment with the adapter by a resiliently compressible member, the valve including at least one flute that facilitates the passage of fluid through the valve when the valve is moved to an open position; and wherein the valve is positioned to engage the tubular nose portion of the mating fitting when the mating fitting is received in the adapted to move the valve toward the open position, and the packing element is positioned on the tubular nose portion such that, as the tubular nose portion is inserted into the adapter, the packing element sealingly engages the adapter prior to the valve being moved to the open position.

* * * * *

UNITED STATES PATENT AND TRADEMARK OFFICE
CERTIFICATE OF CORRECTION

PATENT NO. : 6,942,193 B2
DATED : September 13, 2005
INVENTOR(S) : Perrine It is certified that error appears in the above-identified patent and that said Letters Patent is hereby corrected as shown below:

<u>Column 6,</u>
Line 31, please change "disposld" to -- disposed --.
Line 35, please insert -- wherein -- after "6,".

Signed and Sealed this

Sixth Day of December, 2005

JON W. DUDAS
*Director of the United States Patent and Trademark Office*